May 22, 1934.  R. V. DERRAH  1,959,616
ILLUMINATED ORNAMENT AND SIGN
Filed June 17, 1932
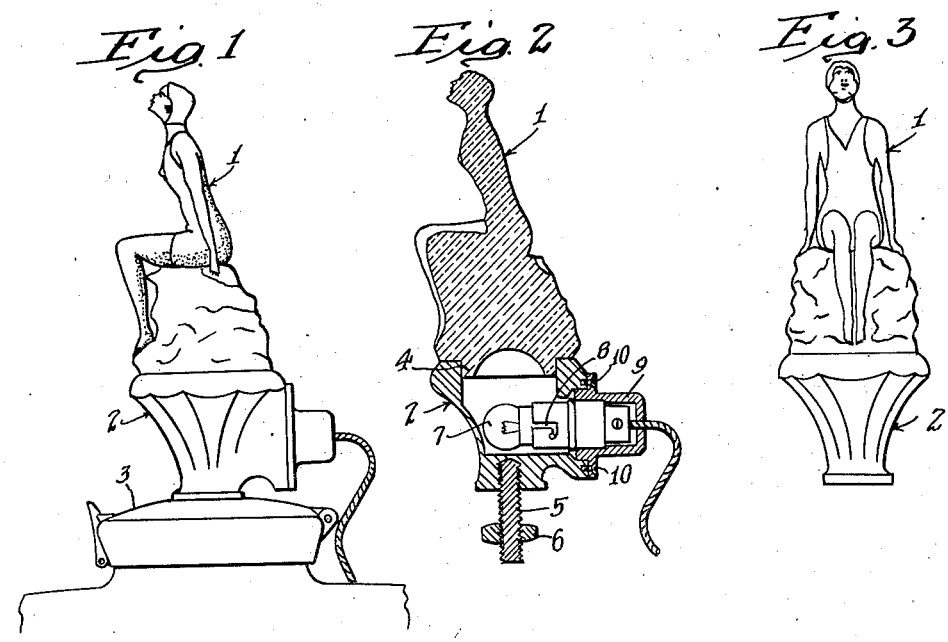
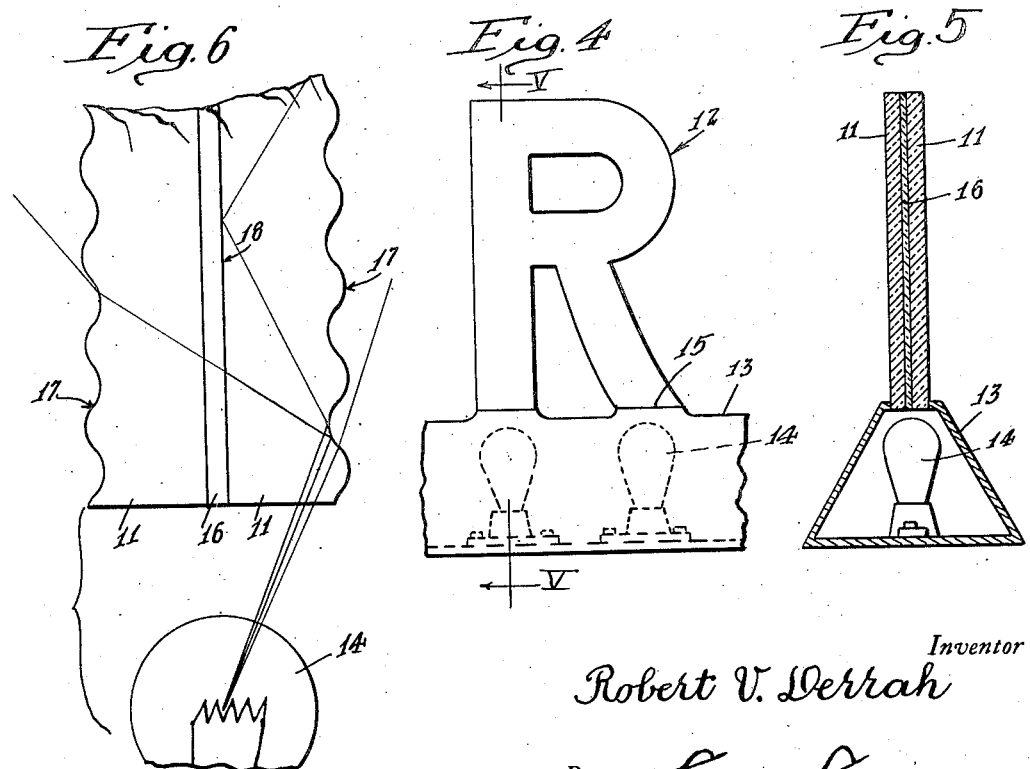
Inventor
Robert V. Derrah
By Lyon & Lyon
Attorneys Patented May 22, 1934

1,959,616

UNITED STATES PATENT OFFICE 1,959,616

ILLUMINATED ORNAMENT AND SIGN

Robert V. Derrah, Beverly Hills, Calif.

Application June 17, 1932, Serial No. 617,716

2 Claims. (Cl. 40—130)

This invention relates to light-emitting objects that may be used either for display purposes or as indirect sources of light for general illumination.

A broad object of the invention is to cause an object of glass or other transparent substance, and of a desired configuration, to emit light from all or part of its outer surface in such a manner as to produce an especially pleasing visual effect.

Briefly, the invention comprises an object of clear glass, or other transparent solid material, illuminated from one side or edge by a primary source of light positioned outside of the object itself but shielded from the direct view of an observer by an opaque container, so that the only light visible is that which passes from the source into the solid object and then is reflected from the rear surface of the object (with reference to an observer) and/or refracted through the front surface to the eye of an observer.

I am aware that it is old to construct ornaments or signs of solid opalescent material, or of transparent material having a frosted surface, and project light into such a solid body from an exterior, shielded source.

In devices utilizing an opalescent, or semi-transparent material, light is reflected outwardly from all parts of the mass. Such devices are open to the objection that a great deal of the light from the primary source is absorbed and converted into heat within the opalescent body, thus giving a very low illuminating efficiency and causing the portions of the body closely adjacent the source to appear much brighter than those parts further away from the source. In fact, the parts of the object most remote from the source may not be illuminated at all.

Devices utilizing a body of transparent material having a frosted outer surface are not subject in the same degree to the criticism directed against devices utilizing bodies of opalescent material, but they offer substantially no advantages from the standpoint of beauty over a hollow shell having a primary source of light positioned directly therein.

A device in accordance with my invention has an illuminating efficiency higher than that of either the opalescent or surface frosted type described, and has the additional advantage that it produces a weirdly beautiful optical effect obtainable in no other way.

Although the invention has many possible applications, its uses and advantages will be apparent from the following detailed description of a radiator ornament for automobiles and of a sign comprising illuminated letters.

In the drawing, Figure 1 is a side elevational view of a radiator ornament in accordance with my invention;

Figure 2 is a side sectional elevational view of the same device;

Figure 3 is a front elevational view of the same device;

Figure 4 is a front elevational view of a portion of a sign in accordance with the invention;

Figure 5 is a cross sectional view in the plane V—V of Figure 4, showing the construction of the sign; and Figure 6 is an enlarged detail side elevational view of a portion of the sign shown in Figure 4.

Referring to Figure 1, I have shown a radiator ornament for an automobile comprising a statuette 1 of clear glass supported by a base 2 which in turn is secured to a radiator cap 3 of an automobile. The statuette 1 as shown depicts a bathing girl sitting upon a rock, but it is obvious that any desired figure or design may be used.

As shown in full in detail in Figure 3, the base 2 is hollow and is open at the top to receive a downwardly depending portion 4 of the statuette 1. The statuette may be secured to the base by cement or in any desired manner. A stud 5 and nut 6 are provided on the lower side of the base 2 for securing it to a radiator cap.

To illuminate the statuette 1, a source of light 7 is positioned within the hollow base 2. This source of light preferably comprises an incandescent electric lamp, as shown, although any other suitable source of light may be employed. For a radiator ornament as shown, the light 7 is preferably a six-volt bulb of low candle power such as is commonly employed for dash and tail lights; it may conveniently be mounted in the usual bayonet socket 8 which, in turn, may be secured to the base 2 by means of a cap 9 attached to the base 2 by screws 10.

It is desirable, although not essential, that the interior surface of the hollow base 2 be brightly finished or polished to reflect as much light as possible into the statuette 1. It is also desirable that the lower face of the statuette positioned within the upper rim of the base 2 be hollowed out to form a curved surface spherical about the filament of the lamp 7 as a center. This is to increase the amount of light reaching the exterior surface of the lower part of the figure. As is well known, light passing obliquely from one medium into another of greater density is bent by refraction away from the surface. Therefore, if the base of the statuette were flat, most of the light passing therethrough from the source 7 would be deflected toward the center of the statuette and little light would directly impinge on the outer surface adjacent the base. However, by curving the bottom face of the statuette 1 so that all parts of the face within the base 2 are perpendicular to light incident thereon from the lamp 7, maximum efficiency of light transmission to all parts of the outer surface of the statuette 1 will be obtained.

Each ray of light, after entering the statuette 1 from the source 7, travels in a straight line through the transparent body of the statuette until it reaches the surface thereof. If it impinges on the surface at an angle of incidence less than the critical angle of the substance, it will be transmitted therethrough and may reach the eye of an observer, in which case it will produce the effect of a source of light positioned at the point of the surface of the statuette from which it issued. On the other hand, a ray of light impinging on the surface at an angle of incidence greater than the critical angle will be completely reflected and will travel back through the body of the statuette until it strikes another portion of the surface; where it may be transmitted through the surface or it may be again reflected, depending upon whether the angle of incidence is less or greater than the critical angle. As a result, some of the light passing from the source 7 into the body 1 may be reflected many times back and forth within the outer confines of the body before it finally passes through the surface. This causes some light to be emitted from substantially every portion of the surface of the statuette, so that the latter is illuminated in a very attractive manner that is very difficult to describe because the effect is not comparable with that of any other method of illumination known to me. It might be described by stating that the statuette appears to be filled with light which, of course, is actually true.

Various novel effects may be produced by utilizing glass of various tints. In fact, it has been found that most common varieties of glass have a greenish tinge that produces a very attractive appearance. The tinting or coloring of the glass should be very slight; otherwise an excessive amount of light is absorbed and lost during transmission through the body 1 and the effect approaches that obtained by the use of opalescent material.

Referring now to Figures 4 and 5 I have shown a fragment of a sign comprising one or more sheets of glass 11 cut in the outline of a letter 12 and supported from a hollow base 13 containing a source of light 14, the latter being depicted as incandescent electric lamp bulbs although they may comprise neon lamps or any other desired type of light source. The lower ends of the letter 12 project through apertures provided therefor in the upper side of the base 13, and these apertures may be provided with flanges 15 extending upwardly about the legs of the letter 12 to support it. However, the base 13 completely encloses the lamps 14 except for the openings containing the legs of the letter; thus no light can escape from the lamps 14 to the eye of an observer except by passing up through the glass body of the letter 12.

The letter 12 may be constructed of a single piece of glass, in which case, light projecting up into the glass from the lamps 14 is reflected and eventually transmitted through the surface of the glass exactly as described in connection with the radiator ornament shown in Figures 1, 2, and 3. However, I have found that delightful color effects may be obtained in a sign of the general type shown in Figure 4 by using a laminated structure as shown in Figure 5 in which two pieces of glass 11 are sandwiched about a thin center lamination 16 of colored or tinted material. By this construction any desired color effect may be produced without diminishing the illumination of the upper part of the letter as would be the case if the entire transparent body were tinted. Thus, referring to Figure 6, much of the light emanating from the lamp 14, after passing through the lower edge of one of the plates 11 would strike the outer surface 17 of the glass at an acute angle and be reflected to impinge at another acute angle, less than the critical angle of the glass on the inner surface 18 of the same plate. It would thereby be reflected back and forth between the two surfaces of the glass several times before it was reflected from the outer surface 17 at a sufficiently high angle with respect to the inner surface 18 to be reflected therethrough. However, whenever a ray of light is reflected from the outer surface 17 at a sufficiently high angle to pass out of the plate 11 at surface 18 it will continue on through the colored lamination 16 and through the opposite plate 11 on the other side of lamination 16 and thence to the eye of an observer. It is therefore apparent that with the construction shown in Figures 5 and 6 much of the light from source 14 will travel completely to the tops of the plates 11 before it is transmitted outwardly to the eye of an observer and thus the entire area of the letter will be substantially evenly illuminated. On the other hand, where, as in accordance with prior practice, a sign as shown in Figure 4 comprises a letter made entirely of colored or opalescent glass, much of the light is absorbed before it reaches the top of the letter, so that the lower part appears to be brightly illuminated but the upper part appears dark.

In the construction of signs such as shown in Figures 4, 5, and 6, it is desirable although not essential to corrugate the outer surfaces 17 of the plates 11 or make them irregular in some other desired pattern, as this causes more of the light from source 14 to be reflected from the outer surface at a high angle with respect to the inner surfaces 18 so that it is transmitted from the entire surface of the sign uniformly. It should be noted particularly, however, that although I may make the outer surface of the plates 11 irregular, I do not frost these surfaces and that I obtain a radically different visual effect by roughly corrugating them than by frosting them.

While it might some times be desirable, for the reasons given, to make the outer surface of the sign irregular to produce an effect of uniform illumination all over the surface, this is by no means essential and a particularly attractive effect may be produced by forming the outer surfaces 17 perfectly smooth, as this causes most of the light to be kept within the body by internal reflection until it reaches the edges of the letter. Most of the light then leaves the sign at the edges and produces the effect of a more or less faintly discernible block letter outlined by brightly illuminated edges.

A device such as disclosed in Figs. 1, 2, and 3, may be constructed with a larger base adapted to rest upon any flat surface, such as a table top, and used as a source of illumination. By using a large lamp, within the base, energized from the usual 110-volt house lighting circuit, such a device can be made to radiate sufficient light to illuminate a room. The light emanates from a sufficiently large surface to avoid objectionable glare and is particularly desirable in sick rooms where a soft, soothing light is desired. Objectionable glare is avoided because the total radiating surface is large as compared to the total light emitted, thus reducing the unit surface intensity of illumination; at the same time, the efficiency is high because there is no opalescent material or frosted surface in the path of the light to absorb it.

I claim:

1. A device of the type described, comprising a symbol of substantial proportions in two dimensions and of relatively limited proportions in the third dimension, said symbol being formed from a plurality of laminations of transparent material, one at least of which laminations is tinted, and means comprising a shielded source of light positioned adjacent one edge of said symbol for directing light into said symbol through said edge.

2. A device of the type described, comprising a substantially flat body of transparent material shaped as a symbol in its lateral dimensions and having some at least of its outer surfaces corrugated, and means comprising a shielded source of light for directing light into said body of transparent material through one or more of its edges.

ROBERT V. DERRAH.